(12) United States Patent
Gunnam

(10) Patent No.: US 8,976,876 B2
(45) Date of Patent: Mar. 10, 2015

(54) COMMUNICATIONS SYSTEM SUPPORTING MULTIPLE SECTOR SIZES

(75) Inventor: Kiran Gunnam, San Jose, CA (US)

(73) Assignee: LSI Corporation, San Jose, CA (US)

( * ) Notice: Subject to any disclaimer, the term of this patent is extended or adjusted under 35 U.S.C. 154(b) by 1172 days.

(21) Appl. No.: 12/910,993

(22) Filed: Oct. 25, 2010

(65) Prior Publication Data
US 2012/0099670 A1   Apr. 26, 2012

(51) Int. Cl.
*H04L 27/00* (2006.01)
*H04L 1/00* (2006.01)

(52) U.S. Cl.
CPC ............ *H04L 1/0067* (2013.01); *H04L 1/0052* (2013.01); *H04L 1/007* (2013.01)
USPC ........................................................ 375/259

(58) Field of Classification Search
CPC ..... H04L 1/0041; H04L 1/005; H04L 1/0066; H04L 1/0067; H04L 1/0068; H04L 1/0052; H04L 1/007
USPC .................... 375/240.27, 260, 262, 267, 295; 714/752, 758, 776
See application file for complete search history.

(56) References Cited

U.S. PATENT DOCUMENTS

| | | | |
|---|---|---|---|
| 3,647,977 A | 3/1972 | Closs | |
| 5,287,491 A | 2/1994 | Hsu | |
| 5,757,795 A | 5/1998 | Schnell | |
| 5,768,270 A | 6/1998 | Ha-Duong | |
| 6,157,643 A | 12/2000 | Ma | |
| 6,335,930 B1 | 1/2002 | Lee | |
| 6,456,838 B1 | 9/2002 | Wang et al. | |
| 7,013,361 B2 | 3/2006 | Liron | |
| 7,881,568 B2 | 2/2011 | Lin | |
| 7,911,364 B1 | 3/2011 | Zhang et al. | |
| 8,065,598 B1 | 11/2011 | Gunnam et al. | |
| 8,099,561 B2 | 1/2012 | Bayer et al. | |
| 8,161,345 B2 | 4/2012 | Graef | |
| 8,170,129 B2 | 5/2012 | Chang et al. | |
| 8,265,070 B2 | 9/2012 | Khanduri | |
| 8,279,867 B2 | 10/2012 | Carley | |
| 2001/0007608 A1 | 7/2001 | Sugita et al. | |
| 2002/0108030 A1 | 8/2002 | Lee et al. | |

(Continued)

OTHER PUBLICATIONS

Jaros, J., "Evolutionary Optimization of Multistage Interconnection Networks Performance," Jul. 8, 2009; GECCO 09.

Schack, C. et al., A Multiprocessor Architecture with an Omega Network for the Massively Parallel Model GCA, 2009, Springer-Verlag.

(Continued)

*Primary Examiner* — Syed Haider
(74) *Attorney, Agent, or Firm* — Hamilton DeSanctis & Cha

(57) ABSTRACT

In one embodiment, a configurable communications system accommodates a plurality of different transmission word sizes. In a transmit path, the system inserts a number of padding bits corresponding to missing user-data bits onto the end of an input data sequence to generate a set of data having N bits. The N bits are interleaved and error-correction (EC) encoded to generate parity bits corresponding to an EC codeword. The parity bits are de-interleaved and multiplexed with the input data stream to generate a transmission word. In a receive path, a channel detector recovers channel values corresponding to the transmission word. Padding values, corresponding to the missing-bit locations, are inserted among the channel values. The resulting channel values are interleaved and EC decoded to recover the EC codeword. The data bits of the codeword are de-interleaved, and the padding bits corresponding to the missing channel values are discarded.

13 Claims, 8 Drawing Sheets

(56) References Cited

U.S. PATENT DOCUMENTS

| | | | |
|---|---|---|---|
| 2002/0174434 A1 | 11/2002 | Lee et al. | |
| 2003/0112797 A1 | 6/2003 | Li et al. | |
| 2004/0225950 A1* | 11/2004 | Siegel et al. | 714/801 |
| 2005/0015234 A1 | 1/2005 | Bhattacharya et al. | |
| 2006/0179401 A1 | 8/2006 | Nefedov | |
| 2006/0282712 A1 | 12/2006 | Argon et al. | |
| 2007/0011569 A1 | 1/2007 | Vila Casado et al. | |
| 2007/0208988 A1 | 9/2007 | Aman et al. | |
| 2008/0028272 A1 | 1/2008 | Richardson | |
| 2008/0056202 A1 | 3/2008 | Kim et al. | |
| 2008/0107103 A1 | 5/2008 | Yang et al. | |
| 2008/0225819 A1* | 9/2008 | Niu et al. | 370/342 |
| 2008/0301536 A1 | 12/2008 | Shin et al. | |
| 2008/0320353 A1 | 12/2008 | Blankenship et al. | |
| 2009/0010365 A1* | 1/2009 | Choi et al. | 375/341 |
| 2009/0024909 A1 | 1/2009 | Shen et al. | |
| 2009/0077447 A1 | 3/2009 | Buckley et al. | |
| 2009/0083606 A1 | 3/2009 | Choi et al. | |
| 2009/0180535 A1 | 7/2009 | Bretl et al. | |
| 2009/0224801 A1 | 9/2009 | Lewin | |
| 2009/0307562 A1* | 12/2009 | Lee et al. | 714/758 |
| 2010/0111014 A1 | 5/2010 | Kang et al. | |
| 2010/0118800 A1 | 5/2010 | Kim et al. | |
| 2010/0169738 A1 | 7/2010 | Wu et al. | |
| 2010/0189162 A1 | 7/2010 | Yoshimoto et al. | |
| 2010/0214857 A1 | 8/2010 | Hsu et al. | |
| 2010/0218066 A1* | 8/2010 | Okamura et al. | 714/752 |
| 2011/0093762 A1 | 4/2011 | Kwon et al. | |
| 2012/0079340 A1 | 3/2012 | Gunnam et al. | |
| 2012/0176856 A1 | 7/2012 | Hsu et al. | |

OTHER PUBLICATIONS

K. Gunnam et al., "Value-Reuse Properties of Min-Sum for GF(q)" (dated Oct. 2006) Dept. of ECE, Texas A&M University Technical Note, published about Aug. 2010.

K. Gunnam et al., "Value-Reuse Properties of Min-Sum for GF (q)" (dated Jul. 2008) Dept. of ECE, Texas A&M University Technical Note, published about Aug. 2010.

K. Gunnam "Area and Energy Efficient VLSI Architectures for Low-Density Parity-Check Decoders Using an On-The-Fly Computation" dissertation at Texas A&M University, Dec. 2006.

Gunnam, Kiran K. et al., "VLSI Architectures for Layered Decoding forIrregular LDPC Codes of WiMax," IEEE Communications Society, ICC 2007 Proceedings, pp. 4542-4547.

Gunnam, Kiran K. et al., "Technical Note on Iterative LDPC Solutions for Turbo Equalization," Department of ECE, Texas A&M University, College Station, TX-77843, Jul. 2006, pp. 1-5.

Al-Qerem, Ahmad H. "Congestion Control by Using a Bufferred Omega Network," IADIS International Conference on Applied Computing 2005, pp. 429-434.

Mahajan, Rita and Vig, Dr. Renu,"Performance and Reliability Analysis of New Fault-Tolerant Advance Omega Network," WSEAS Transactions on Computers, Issue 8, vol. 7, Aug. 2008, pp. 1280-1290.

Aljundi, Ahmad Chadi et al., "A Study of an Evaluation Methodology for Unbuffered Multistage Interconnection Networks,"IPDPS '03 Proceedings of the 17th International Symposium on Parallel and Distributed Processing, 2003, pp. 1-8.

* cited by examiner $$H = \begin{pmatrix} B_{1,1} & B_{1,2} & \cdots & B_{1,54} \\ B_{2,1} & B_{2,2} & \cdots & B_{2,54} \\ B_{3,1} & B_{3,2} & \cdots & B_{3,54} \\ B_{4,1} & B_{4,2} & \cdots & B_{4,54} \end{pmatrix} \begin{matrix} \} r = 4 \end{matrix}$$

COMMUNICATIONS SYSTEM SUPPORTING MULTIPLE SECTOR SIZES

CROSS-REFERENCE TO RELATED APPLICATIONS

The subject matter of this application is related to:
U.S. patent application Ser. No. 12/113,729 filed May 1, 2008,
U.S. patent application Ser. No. 12/113,755 filed May 1, 2008,
U.S. patent application Ser. No. 12/323,626 filed Nov. 26, 2008,
U.S. patent application Ser. No. 12/401,116 filed Mar. 10, 2009,
U.S. patent application Ser. No. 12/675,981 filed on Mar. 2, 2010,
U.S. patent application Ser. No. 12/677,322 filed Mar. 10, 2010,
U.S. patent application Ser. No. 12/680,810 filed Mar. 30, 2010,
U.S. patent application Ser. No. 12/524,418 filed on Jul. 24, 2009,
U.S. patent application Ser. No. 12/420,535 filed Apr. 8, 2009,
U.S. patent application Ser. No. 12/475,786 filed Jun. 1, 2009,
U.S. patent application Ser. No. 12/260,608 filed on Oct. 29, 2008,
PCT patent application No. PCT/US09/41215 filed on Apr. 21, 2009,
U.S. patent application Ser. No. 12/427,786 filed on Apr. 22, 2009,
U.S. patent application Ser. No. 12/492,328 filed on Jun. 26, 2009,
U.S. patent application Ser. No. 12/492,346 filed on Jun. 26, 2009,
U.S. patent application Ser. No. 12/492,357 filed on Jun. 26, 2009,
U.S. patent application Ser. No. 12/492,374 filed on Jun. 26, 2009,
U.S. patent application Ser. No. 12/538,915 filed on Aug. 11, 2009,
U.S. patent application Ser. No. 12/540,078 filed on Aug. 12, 2009,
U.S. patent application Ser. No. 12/540,035 filed on Aug. 12, 2009,
U.S. patent application Ser. No. 12/540,002 filed on Aug. 12, 2009,
U.S. patent application Ser. No. 12/510,639 filed on Jul. 28, 2009,
U.S. patent application Ser. No. 12/524,418 filed on Jul. 24, 2009,
U.S. patent application Ser. No. 12/510,722 filed on Jul. 28, 2009,
U.S. patent application Ser. No. 12/510,667 filed on Jul. 28, 2009,
U.S. patent application Ser. No. 12/644,622 filed on Dec. 22, 2009,
U.S. patent application Ser. No. 12/644,181 filed on Dec. 22, 2009,
U.S. patent application Ser. No. 12/766,038 filed on Apr. 23, 2010,
U.S. patent application Ser. No. 12/827,652 filed on Jun. 30, 2010,
U.S. patent application Ser. No. 12/644,314 filed on Dec. 22, 2009,
U.S. patent application Ser. No. 12/826,026 filed on Jun. 29, 2010,
U.S. patent application Ser. No. 12/835,989 filed on Jul. 14, 2010, and
U.S. patent application Ser. No. 12/891,161 filed on Sep. 27, 2010
the teachings of all of which are incorporated herein by reference in their entirety.

BACKGROUND OF THE INVENTION

1. Field of the Invention

The present invention relates to signal processing, and, more specifically but not exclusively, to techniques for encoding and decoding data.

2. Description of the Related Art

Some conventional hard-disk drive (HDD) systems employ encoding, such as low-density parity-check (LDPC) encoding, to generate data for storage on their hard-disk platters. One conventional LDPC encoder receives 4,512-bit datawords and generates 5,184-bit codewords having the 4,512 user-data bits and 672 parity bits.

In HDD systems, the number of bits per platter sector may vary from one manufacturer to the next or from one manufacturer's model to the next. For example, a "0.5 KB" sector may have as few as 4,096 bits or as many as 5,184 bits. One manufacturer might design an HDD system having "0.5 KB" sectors that store 5,184 bits, while another manufacturer might design a different HDD system having "0.5 KB" sectors that store 4,116 bits. To accommodate such variations in sector sizes, different encoders and decoders could be implemented for each HDD system based on the number of bits stored in the sectors of the HDD system. However, manufacturing different encoders and decoders for every different possible sector size can be time consuming and expensive.

Rather than design different encoders and different decoders to support different sector sizes, a single configurable HDD system may be implemented that can be configured to accommodate different sector sizes. In such implementations, the encoder is designed to generate codewords having a fixed number of bits. When the encoder is used to generate sets of data (referred to herein as "transmission words") for storage on a hard-disk platter whose sectors are smaller than that fixed codeword size, sufficiently small sets of user-data bits are used to generate each codeword. In particular, a sufficient number of padding bits are added to each set of user-data bits to generate a full dataword for application to the encoder, and the padding bits are discarded from the resulting codeword to generate a transmission word that is sized appropriately for storage to the hard-disk platter. This technique is sometimes referred to as "code shortening."

In such implementations, the number of user-data bits encoded and the number of padding bits added varies depending on the sector size. Further, the padding bits are set to values (e.g., all zeros or all ones) and at locations that are known a priori by the receiver side of the HDD system. Upon receiving the transmission word from the HDD platter, the receiver inserts appropriate padding bits to reconstruct the codeword. Then, the codeword is decoded to recover the dataword, and the padding bits are removed to recover the original user-data stream.

SUMMARY OF THE INVENTION

In one embodiment, the present invention is a computer-implemented method for generating a transmission word for a set of user-data values. According to the method, a set of padding values are added to the set of user-data values to form a dataword. The data word is interleaved, and the interleaved dataword is encoded to generate a codeword comprising the set of user-data values and a set of parity values. The transmission word is generated, which comprises the set of user-data values and the set of parity values, wherein the transmission word is smaller than the codeword.

In another embodiment, the present invention is an apparatus for generating a transmission word for a set of user-data values. The apparatus comprises a padding-value inserter, an interleaver, an encoder, and a transmission-word generator. The padding-value inserter is adapted to add a set of padding values to the set of user-data values to form a dataword. The interleaver is adapted to interleave the dataword. The encoder is adapted to encode the interleaved dataword to generate a codeword comprising the set of user-data values and a set of parity values. The transmission-word generator is adapted to generate the transmission word comprising the set of user-data values and the set of parity values, wherein the transmission word is smaller than the codeword.

In yet another embodiment, the present invention is a computer-implemented method for recovering a set of user-data values from a transmission word. According to the method, a set of padding values is added to the transmission word to form a padded transmission word, wherein the transmission word comprises values corresponding to the set of user-data values and a set of parity values. The padded transmission word is interleaved to form an interleaved padded transmission word. Then, the interleaved padded transmission word is decoded to recover a codeword comprising the set of user-data values, the set of padding values, and the set of parity values, wherein the transmission word is smaller than the codeword.

In yet still another embodiment, the present invention is an apparatus for recovering a set of user-data values from a transmission word. The apparatus comprises a padding-value inserter, an interleaver, and a decoder. The padding-value inserter is adapted to add a set of padding values to the transmission word to form a padded transmission word, wherein the transmission word comprises values corresponding to the set of user-data values and a set of parity values. The interleaver is adapted to interleave the padded transmission word to form an interleaved padded transmission word. The decoder is adapted to decode the interleaved padded transmission word to recover a codeword comprising the set of user-data values, the set of padding values, and the set of parity values, wherein the transmission word is smaller than the codeword.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 2 shows an exemplary parity-check matrix that may be used by the communications system of FIG. 1;

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Figure 1:
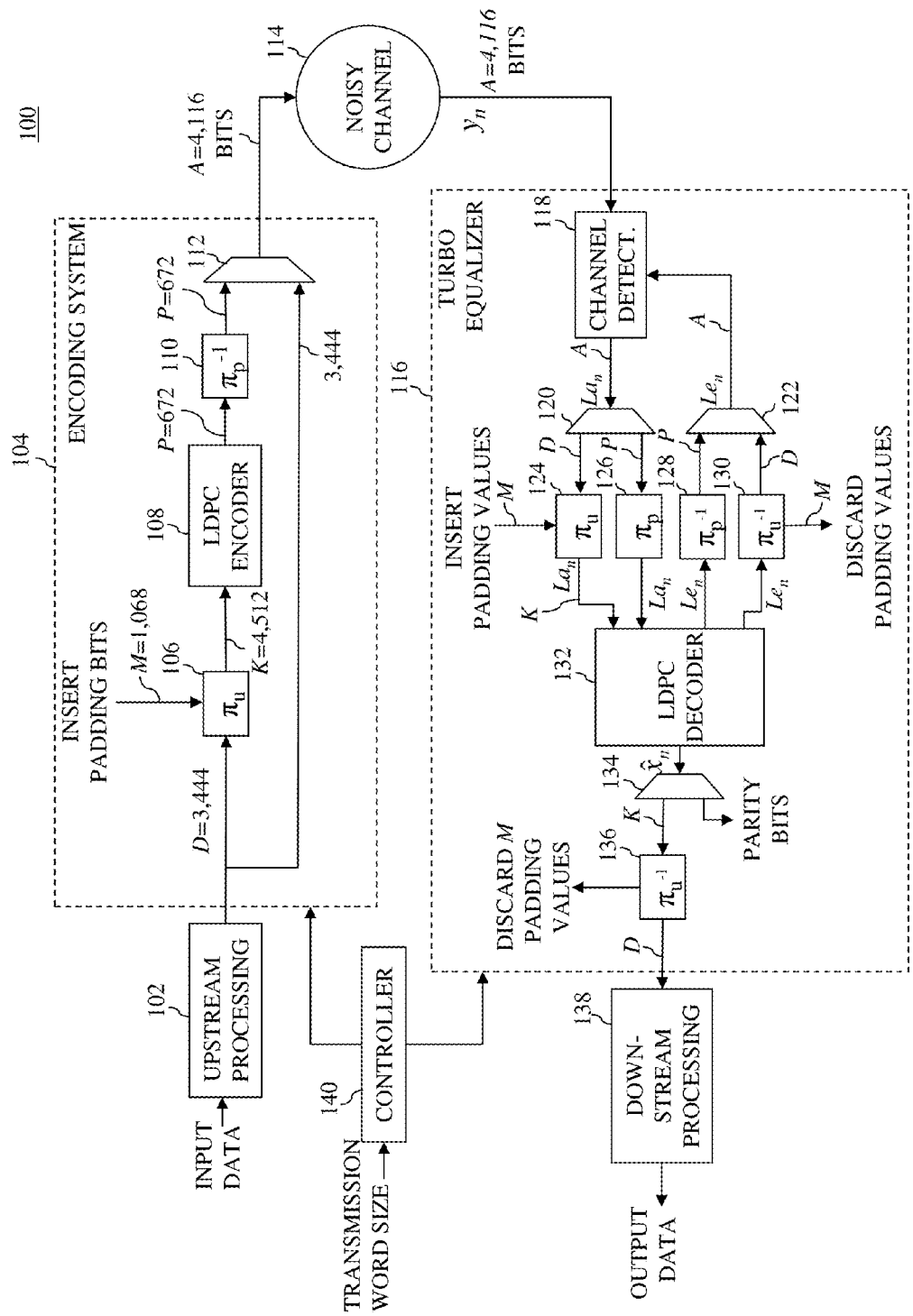
FIG. 1 shows a simplified block diagram of a communications system according to one embodiment of the present invention that may be used to support a range of transmission word sizes.

FIG. 1 shows a simplified block diagram of a communications system 100 according to one embodiment of the present invention that may be used to support a range of transmission word sizes. Communications system 100 has (i) an upper path, herein referred to as the write path (or transmit path), in which an input data stream is processed and transmitted over noisy channel 114, and (ii) a lower path, herein referred to as the read path (or receive path), in which data is received from noisy channel 114 and processed to recover the original input data stream that was transmitted by the write path.

Communications system 100 may be any communications system suitable for transmitting an input data stream, such as a wireless communications system or a hard-disk drive (HDD) system. When implemented as a wireless communications system, noisy channel 114 is a wireless transmission medium, and, when implemented as an HDD system, noisy channel 114 is a hard-disk (HD) platter.

In the write path, upstream processing 102 receives an input user-data stream from, for example, a user application. Upstream processing 102 may implement an error-detection encoding scheme such as cyclic-redundancy-check (CRC) encoding or any other suitable error-detection encoding scheme. Upstream processing 102 may also perform other suitable processing, such as run-length encoding, to prepare the input user-data stream for processing by encoding system 104. Encoding system 104, which may be implemented in an integrated circuit, performs error-correction encoding and other processing as described in further detail below to generate a transmission word. The transmission word may then be processed using further processing (not shown), such as digital-to-analog conversion, pre-amplification, and possibly other suitable processing to prepare the transmission word for transmission over noisy channel 114.

In the read path, turbo equalizer 116, which may be implemented in an integrated circuit together with, or independently from, encoding system 104, receives transmission words transmitted over noisy channel 114. The transmission words may be pre-processed using processing (not shown), such as amplification, analog-to-digital conversion, finite-impulse-response (FIR) filtering, equalization, and possibly other processing suitable for preparing transmission words for decoding. Turbo equalizer 116 performs error-correction decoding and other processing as described in further detail below in an attempt to recover the original input user-data stream encoded in the write path. The output of turbo equalizer 116 is then provided to downstream processing 138, which may perform, for example, a cyclic-redundancy check (CRC) and other processing suitable to determine whether the LDPC codeword recovered by LDPC decoder 132 is the correct LDPC codeword (i.e., the codeword that was generated by the write path).

In general, Encoding system 104 receives the input user-data stream and generates a transmission word for transmission over noisy channel 114. To reduce the effects that burst errors in the transmission channel have on recovering data in the read path, Encoding system 104 and turbo equalizer 116 together employ a data interleaving scheme in which the data is encoded in an interleaved domain and transmitted in an un-interleaved domain. In other words, Encoding system 104 interleaves the input user-data stream and encodes the resulting interleaved data to generate an encoded codeword. Encoding system 104 then de-interleaves the resulting parity bits and multiplexes the de-interleaved parity-bits with the un-interleaved data for transmission. At the receiver, in order to be able to recover the encoded codeword, turbo equalizer 116 (i) interleaves the received encoded codeword, (ii) decodes the interleaved encoded codeword, and (iii) de-interleaves the resulting decoded data to obtain the original bitstream.

In addition to performing interleaving, Encoding system 104 is configurable to generate transmission words having varying numbers of bits. For example, suppose that noisy channel 114 is an HD platter having "0.5 KB" sectors. Encoding system 104 may support the full range of "0.5 KB" sector sizes (e.g., 4,096 to 5,184 bits). Thus, if the HD platter is designed with 5,184-bit sectors, then Encoding system 104 may be configured to generate transmission words having A=5,184 bits. As another example, if the HD platter is designed with 4,116-bit sectors, then Encoding system 104 may be configured to generate transmission words having A=4,116 bits.

Encoding system 104 has low-density parity-check (LDPC) encoder 108, which generates LDPC-encoded codewords based on an LDPC generator matrix. The LDPC generator matrix is derived from a parity-check matrix that is used by LDPC decoder 132 in turbo equalizer 116 to decode LDPC-encoded codewords. The parity-check matrix is selected such that the resulting generator matrix may be used to generate codewords having the maximum number of bits in the sector range. For example, for "0.5 KB" sectors that range from 4,096 to 5,184 bits, a parity-check matrix is selected that yields an LDPC generator matrix for generating LDPC-encoded codewords having 5,184 bits.

FIG. 2 shows an exemplary parity-check matrix 200 that may be used by communications system 100 to decode codewords having 5,184 bits. Parity-check matrix 200, commonly referred to as an H-matrix, comprises 216 sub-matrices $B_{j,k}$ that are arranged in (i) r=4 rows of sub-matrices, herein referred to as block rows, where j=1, ..., r and (ii) c=54 columns of sub-matrices, herein referred to as block columns, where k=1, ..., c. Each sub-matrix may be, for example, an identity matrix or a circulant, which is a matrix that is obtained by cyclically shifting an identity matrix. Further, each sub-matrix is a p×p sub-matrix, where p=96 such that H-matrix 200 has p×r=96×4=384 total rows and p×c=96× 54=5,184 total columns.

Each individual column of H-matrix 200 corresponds to one bit of the LDPC-encoded codeword, and thus, an LDPC encoded codeword based on H-matrix 200 has N=5,184 total bits. The p (e.g., 96) individual columns in each block column of H-matrix 200 may correspond to (i) all data bits, (ii) all parity bits, or (iii) a combination of data and parity bits. For this discussion, assume that (i) the first seven block columns (i.e., p×7=96×7=672 individual columns) correspond to only parity bits and (ii) the remaining 47 block columns (i.e., p×24=96×47=4,512 individual columns) correspond to only user-data bits. Thus, H-matrix 200 has a total of K=4,512 user-data columns and P=N−K=5,184−4,512=672 parity columns.

Referring back to FIG. 1, after a transmission word size A is selected for communications system 100, the transmission word size A is input to controller 140, which configures Encoding system 104 and turbo equalizer 116 to generate and process transmission words having the selected size. For illustrative purposes, suppose that a transmission word size A=4,116 is selected. In this example, for each LDPC-encoded codeword generated by LDPC encoder 108, D=3,444 user-data bits (i.e., D=A−P=4,116−672=3,444) are provided to local/global interleaver 106, which is M=1,068 user-data bits less than the K=4,512 user-data bits encoded by LDPC encoder 108 (i.e., M=K−D=4,512−3,444=1,068). As local/global interleaver 106 receives the 3,444 user-data bits, local/global interleaver 106 inserts M=1,068 padding bits at the end of the set of D user-data bits, where each of the 1,068 padding bits is set to a value of zero. Upon inserting the 1,068 padding bits, local/global interleaver 106 interleaves the 4,512 total bits and padding bits using an interleaving mapping scheme $\pi_u$. A more-detailed explanation of the insertion of the 1,068 padding bits and the interleaving of the 4,512 total bits is discussed below in relation to FIG. 3, FIG. 4, and FIG. 5.

Note that controller 140 varies the number D of user-data bits and the number M of padding bits interleaved by local/global interleaver 106 based on the size of the transmission word A selected. If local/global interleaving 106 were performed before the M padding bits were inserted, then (i) local/global interleaver 106 would need to be configurable to handle the variable number of user-data bits, or (ii) multiple differently sized local/global interleavers would need to be implemented to handle the variable number of user-data bits. By inserting the M padding bits at the input of local/global interleaver 106, the same number K of total bits (e.g., 4,512) are interleaved by local/global interleaver 106, regardless of the number of user-data bits that are received by local/global interleaver 106. Thus, only one local/global interleaver 106 is needed to handle the variable number of user-data bits that may be received, and local/global interleaver 106 need not be configurable to handle the variable number of user-data bits.

By inserting the padding bits in the un-interleaved domain at the end of the user data, the location of only the first padding bit need be stored for recovery in the read path. Thus, instead of storing the location of each padding bit, communications system 100 need only store the location of the first padding bit. Note that the location of the first padding bit may vary depending on the number of padding bits inserted.

LDPC encoder 108 performs LDPC encoding on the 4,512 interleaved bits to generate an LDPC-encoded codeword having 5,184 bits, of which 672 bits are parity bits. The 672 parity bits are de-interleaved by local/global de-interleaver 110, which implements a de-interleaving mapping scheme $\pi_p^{-1}$, and the de-interleaved parity bits are provided to the upper input of multiplexer 112. Multiplexer 112 receives the 3,444 original, un-interleaved user-data bits at its lower input and inserts the 672 de-interleaved parity bits within the input user-data stream to generate a 4,116-bit transmission word. For example, multiplexer 112 may insert one nibble of parity bits for every eight nibbles of user-data bits, where a nibble is a group of four bits. Thus, together, local/global de-interleaver 110 and multiplexer 112 function as a transmission word generator that generates transmission words from the 672 parity bits and the 3,444 original, un-interleaved user-data bits. Note that the 1,068 padding bits do not form part of the transmission word, and thus, are not transmitted. Further, when communications system 100 is implemented as an HDD system, the 4,116-bit transmission word corresponds to a 4,116-bit sector.

In the read path, turbo equalizer 116 receives 4,116-bit transmission words transmitted over noisy channel 114. The transmission words may be pre-processed using processing (not shown), such as amplification, analog-to-digital conversion, finite-impulse-response (FIR) filtering, equalization, and possibly other processing suitable for preparing transmission words for decoding. Samples $y_n$ of the retrieved transmission words are provided to turbo equalizer 116, which has at least one channel detector 118 and at least one LDPC decoder 132. Turbo equalizer 116 may be implemented in many different ways, and the details of turbo equalizer 116 are provided merely to illustrate the basic components of an exemplary turbo equalizer.

For each transmission word processed, a set of A=4,116 samples $y_n$ is provided to channel detector 118. Channel detector 118 implements a suitable channel-detection technique, such as Viterbi soft-output detection or maximum a posteriori (MAP) detection, to generate a channel soft-output value $La_n$ (e.g., a log-likelihood ratio (LLR)) corresponding to each bit of the transmission word. As used herein, the term "soft-output value" refers to a value comprising a hard-decision bit (i.e., the most-significant bit) and at least one confidence-value bit (i.e., the least-significant bits).

Channel detector 118 provides the channel soft-output values $La_n$ to de-multiplexer 120, which de-multiplexes the N=3,444 channel soft-output values $La_n$ corresponding to the user-data bits of the LDPC-encoded codeword from the P=672 channel soft-output values $La_n$ corresponding to the parity bits. The parity channel soft-output values $La_n$ are interleaved by local/global interleaver 126, which implements an interleaving mapping scheme $\pi_p$ that is the inverse of the de-interleaving mapping scheme $\pi_p^{-1}$ used by local/global de-interleaver 110. Thus, the sequence of parity channel soft-output values $La_n$ output by local/global interleaver 126 corresponds to the sequence of parity bits input to local/global de-interleaver 110.

Local/global interleaver 124 inserts M=1,068 channel soft-output values (i.e., herein referred to as "padding values") onto the end of the set of N channel soft-output values. Each padding value corresponds to a padding bit inserted by interleaver 106. The hard-decision bit of each padding value is set to zero, and the corresponding confidence value is set to maximum (e.g., maximum LLR). Local/global interleaver 124 interleaves the M+N=1,068+3,444=4,512 total received soft-output values using an interleaving mapping scheme $\pi_u$ that corresponds to the interleaving mapping scheme of local/global interleaver 106. Thus, the sequence of user-data soft-output values $La_n$ output from local/global interleaver 124 corresponds to the sequence of user-data bits output by local/global interleaver 106.

Local/global interleavers 124 and 126 output their respective interleaved soft-output values $La_n$ to LDPC decoder 132, which implements LDPC decoding to recover the correct LDPC-encoded codeword. In so doing, LDPC decoder 132 generates a set of updated soft-output values $P_n$, where each value $P_n$ corresponds to the $n^{th}$ bit of the LDPC-encoded codeword, and each updated soft-output value $P_n$ comprises a hard-decision bit $x_n$ and a confidence value. The hard-decision bits $x_n$ corresponding to user data, herein referred to as user-data hard-decision bits $x_n$, are de-multiplexed from the hard-decision bits $x_n$ corresponding to parity bits, herein referred to as parity hard-decision bits $x_n$, using de-multiplexer 134.

The user-data hard-decision bits $x_n$ are de-interleaved using local/global de-interleaver 136, which implements a de-interleaving mapping scheme $\pi_u^{-1}$ that is the inverse of the interleaving mapping $\pi_u$ used by local/global interleaver 106. Further, the M=1,068 bits corresponding to the padding values that were inserted by local/global interleaver 124 are discarded. Thus, the sequence of user-data hard-decision bits $x_n$ output from local/global de-interleaver 136 corresponds to the original sequence of un-interleaved, received user-data bits that is input to local/global interleaver 106.

The de-interleaved user-data hard-decision bits $x_n$ are provided to downstream processing 138, which may perform, for example, a cyclic-redundancy check (CRC) to determine whether the LDPC codeword recovered by LDPC decoder 132 is the correct LDPC codeword (i.e., the codeword that was generated by the write path). The parity hard-decision bits $x_n$ may be used for debugging or other purposes, but are not typically provided downstream along with the user-data hard-decision bits $x_n$.

In addition to outputting hard-decision bits $x_n$, LDPC decoder 132 may output an extrinsic soft-output value $Le_n$ for each bit n of the LDPC-encoded codeword as shown in Equation (1) below:

$$Le_n = P_n - La_n. \qquad (1)$$

The extrinsic soft-output values $Le_n$ corresponding to the user-data bits are de-interleaved by local/global de-interleaver 130, which implements a de-interleaving mapping scheme $\pi_u^{-1}$ that is the inverse of the interleaving mapping scheme $\pi_u$ used by local/global interleaver 106. Further, local/global de-interleaver 130 removes the M=1,068 extrinsic soft-output values $Le_n$ corresponding to the padding bits.

The parity extrinsic soft-output values $Le_n$ are de-interleaved by local/global de-interleaver 128, which implements a de-interleaving mapping scheme $\pi_p^{-1}$ that corresponds to the de-interleaving mapping scheme $\pi_p^{-1}$ used by local/global de-interleaver 110. The de-interleaved user-data extrinsic soft-output values $Le_n$ and the de-interleaved parity extrinsic soft-output values $Le_n$ are multiplexed by multiplexer 122 and provided to channel detector 118, which uses the extrinsic soft-output values $Le_n$ to improve detection. For example, in Viterbi detection, the extrinsic soft-output values $Le_n$ are used to improve the branch-metric calculation.

For ease of discussion, this specification uses the terms "interleaver," "interleaving," "de-interleaver," and "de-interleaving" relative to the order of bits of the LDPC-encoded codeword. For example, component 124 of system 100 is referred to as an "interleaver" because component 124 (i) receives channel soft-output values $La_n$ from channel detector 118 in an order that corresponds to the order of bits in the un-interleaved LDPC-encoded codeword output by multiplexer 112, and (ii) outputs channel soft-output values $La_n$ in an order, herein referred to as the "codeword order," that corresponds to the order of bits in the interleaved LDPC-encoded codeword.

However, component 124 may also be considered to be a "de-interleaver" relative to the order in which bits are transmitted over noisy channel 114. For example, component 124 may be referred to as a "de-interleaver" because component 124 (i) receives channel soft-output values $La_n$ from channel detector 118 in an order that does not correspond to the codeword order, herein referred to as the "channel order," and (ii) outputs channel soft-output values $La_n$ in an order other than the channel order (i.e., the codeword order). Analogous to component 124, components 106, 110, 126, 128, 130, and 136 may also be referred to as either "interleavers" or "de-interleavers."

Further, it is important to note that interleavers 106, 124 and 126, and de-interleavers 110, 128, 130, and 136 could be implemented in systems other than system 100, including systems that do not employ LDPC encoding/decoding. In such systems, the use of the terms "interleaver," "interleaving," "de-interleaver," and "de-interleaving" might not be used relative to the order of bits of an LDPC-encoded codeword. Rather, they might be used relative to some other order in which the values are received and/or output.

Thus, although the terms "interleaver" and "interleaving" are used to refer to certain components in this specification, it will be understood that the terms "de-interleaver" and "de-interleaving" may also be used interchangeably to refer to those components. Similarly, although the terms "de-interleaver" and "de-interleaving" are used to refer to certain other components in this specification, it will be understood that the terms "interleaver" and "interleaving" may also be used interchangeably to refer to those other components.

In light of the previous explanation, as used in the claims, unless made explicitly clear in the claim, the terms "interleaver" and "de-interleaver" are interchangeable, and the terms "interleaving" and "de-interleaving" are interchangeable. For example, a system having a transmitter with an interleaver and a receiver with a corresponding de-interleaver, could be equivalently referred to as a system having a transmitter with a de-interleaver and a receiver with a corresponding interleaver.

Figure 3:
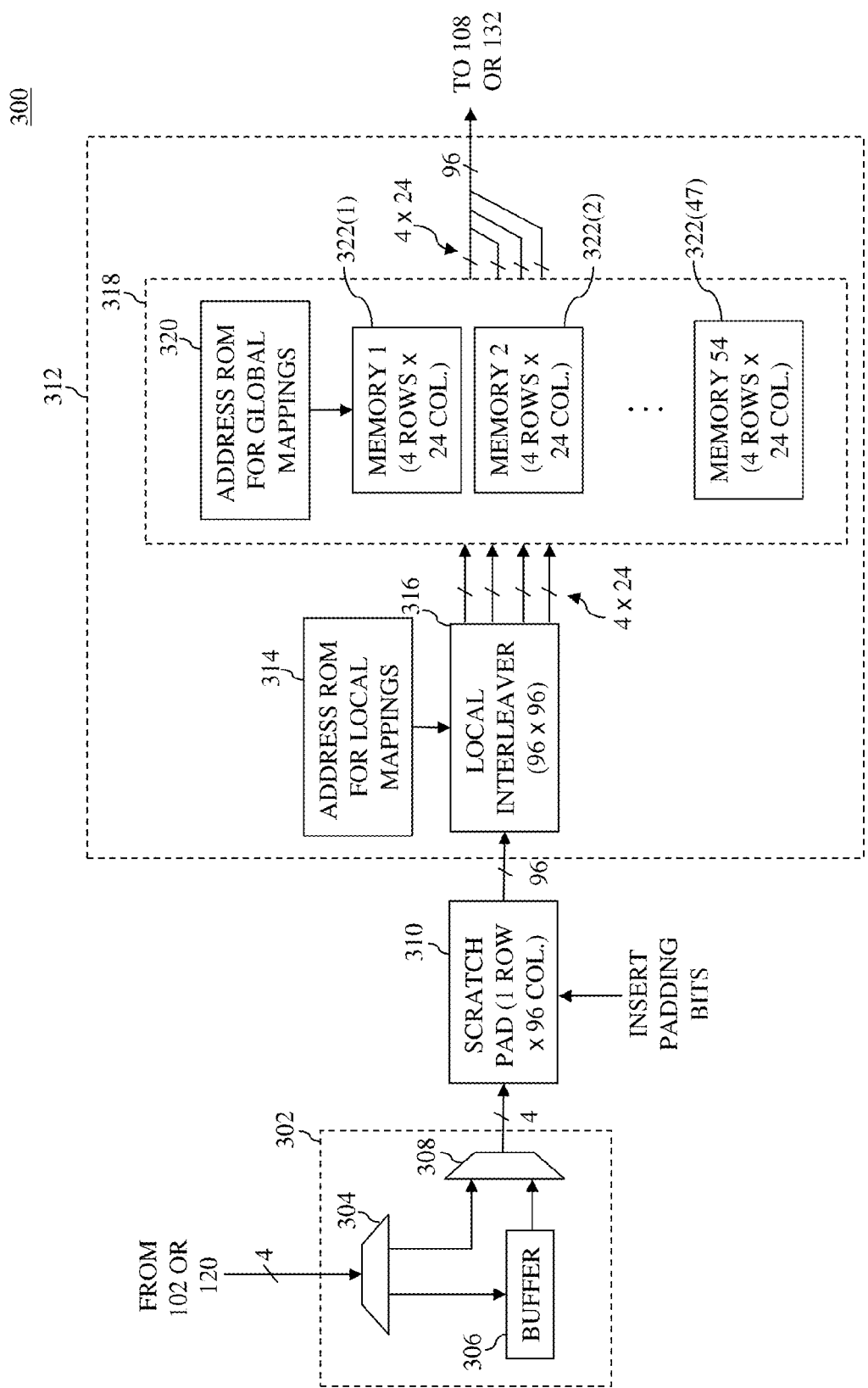
FIG. 3 shows a simplified block diagram of a local/global interleaver according to one embodiment of the present invention.

FIG. 3 shows a simplified block diagram of a local/global interleaver 300 according to one embodiment of the present invention that may be used to implement each of local/global interleavers 106 and 124 in FIG. 1. A discussion of an interleaver similar to interleaver 300, without padding-bit insertion (e.g., similar to interleaver 126), may be found in U.S. patent application Ser. No. 12/835,989. When used to implement each of interleavers 106 and 124, one skilled in the art would recognize that various parameters used by interleaver 300 may vary depending on which interleaver is being implemented. For example, the size of global interleaver memory 322 may vary, and the size of the values processed by interleaver 300 (e.g., bits vs. soft-values) may vary. For ease of discussion, interleaver 300 is discussed relative to its use in implementing interleaver 106.

Local/global interleaver 300 has partitioning circuitry 302 and scratch pad memory 310, which together perform the 1,068 padding-bits insertion and a perfect shuffle on 4,512 total bits. In essence, 4,512 total bits are broken into 94 chunks of user-data bits, where each chunk has p/2=96/2=48 bits (i.e., 4,512 total user-data bits/(48 bits/chunk)=94 chunks). Then, the first 47 chunks are interleaved with the second 47 chunks on a chunk-by-chunk basis, such that chunks from the first 47 chunks alternate with chunks from the second 47 chunks.

In general, partitioning circuitry 302 performs pre-padding interleaving (i.e., an interleaving operation before the padding bits are inserted). Partitioning circuitry 302, which receives the 3,444 user-data bits from upstream processing 102 at a rate of four user-data bits per clock cycle, splits the 3,444 received user-data bits into (i) 71 chunks of received user-data bits, each chunk having 48 user-data bits and (ii) one partial chunk of received user-data bits having the remaining 36 received user-data bits (i.e., (71×48)+36=3,444). The 3,444 received user-data bits are 1,068 user-data bits short of the 4,512 total bits needed for the perfect shuffle. As described below, padding bits for the missing 1,068 user-data bits are inserted at scratch pad memory 310, and thus, scratch pad memory 310 functions as a padding-value inserter.

De-multiplexer 304 provides the first K/2=4,512/2=2,256 received user-data bits to buffer 306, which stores the 2,256 received user-data bits and provides them to the lower input of multiplexer 304. The remaining D−(K/2)=3,444−2,256=1,722 received user-data bits are provided to the upper input of multiplexer 308. Multiplexer 308 then initially outputs chunks of 48 user-data bits from the upper and lower inputs to scratch pad memory 310 in alternating fashion. For example, a chunk of 48 user-data bits is output from the lower input at a rate of four user-data bits per clock cycle, followed by a chunk of 48 user-data bits from the upper input at a rate of four user-data bits per clock cycle, followed by another chunk of 48 user-data bits from the lower input at a rate of four user-data bits per clock cycle, and so on.

Scratch pad memory 310, which has one row for storing p=96 bits, accumulates sets of 96 bits and outputs the sets to post-padding interleaver 312. Initially, the sets of 96 bits are composed of two alternating chunks of 48 bits received from multiplexer 308. Note, however, that the upper input of multiplexer 308 receives fewer bits than the lower input (1,722 as opposed to 2,256). As a result, the upper input runs out of bits before the lower input. When this occurs, local/global interleaver 300 begins inserting padding bits at scratch pad memory 310 in lieu of receiving bits from the upper input of multiplexer 308. To further understand the operation of partitioning circuitry 302 and scratch pad memory 310, consider FIG. 4.

Figure 4:
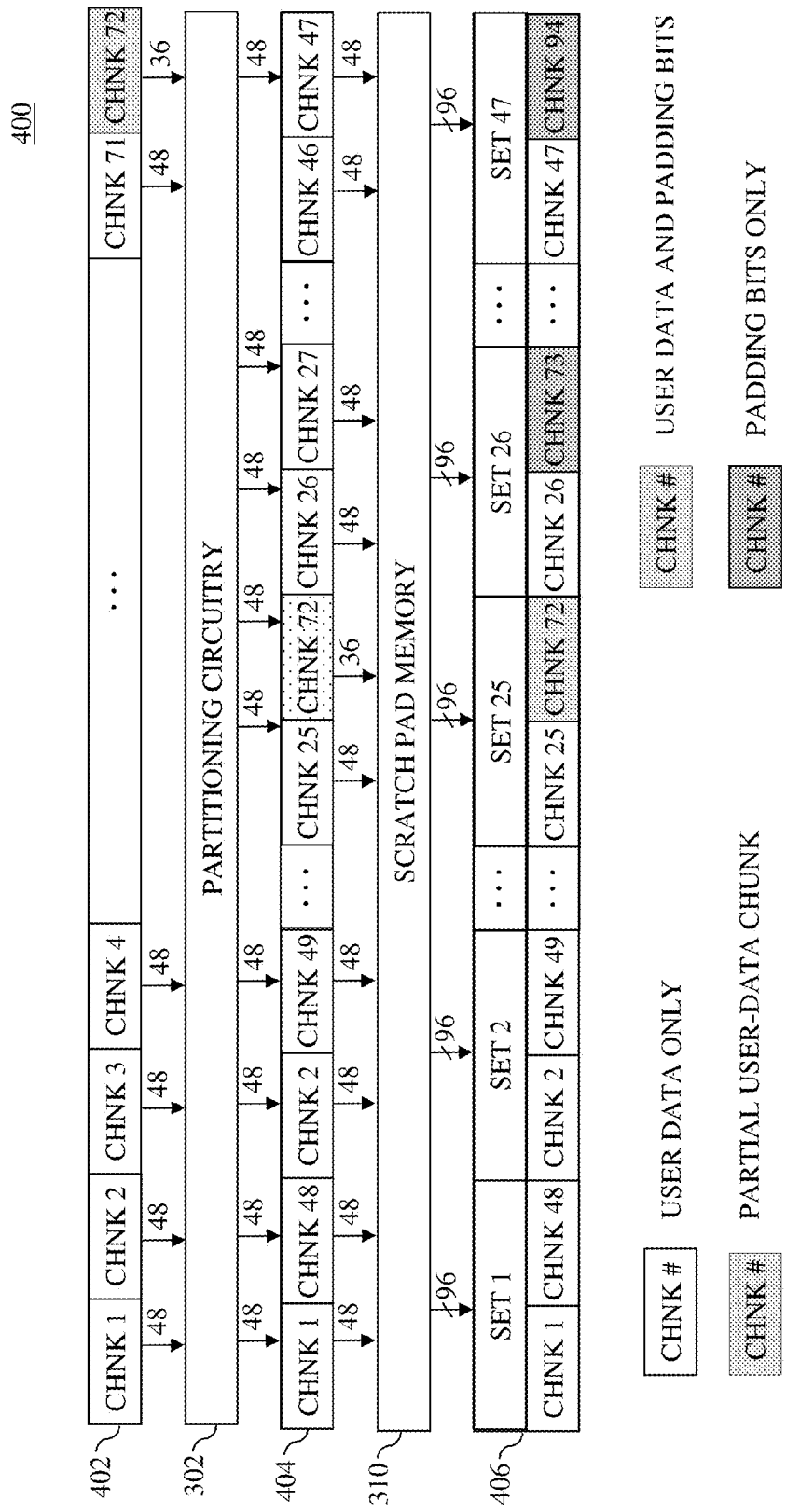
FIG. 4 shows a data flow diagram of an exemplary partitioning and padding bit insertion operation performed by the partitioning circuitry and scratch pad memory in FIG. 3.

FIG. 4 shows a data flow diagram 400 for an exemplary partitioning and padding bit insertion operation performed by partitioning circuitry 302 and scratch pad memory 310. As shown in row 402, partitioning circuitry 302 receives the 3,444 user data bits from left to right, where the 3,444 received user data bits may be separated into (i) 71 chunks of received user-data bits (i.e., chunks 1-71), each chunk having 48 user-data bits and (ii) one partial chunk (i.e., chunk 72) of received user-data bits having the remaining 36 received user-data bits.

Initially, as shown in row 404, partitioning circuitry 302 outputs the chunks of received user-data bits to scratch pad memory 310 in alternating fashion. In particular, the lower input of multiplexer 308 of partitioning circuitry 302 provides chunk 1, then the upper input of multiplexer 308 provides chunk 48, then the lower input provides chunk 2, then the upper input provides chunk 49, and so on. This pattern continues until the lower input provides chunk 25 and the upper input provides partial chunk 72. At this point, the upper input of multiplexer 308 has run out of received user-data bits. Accordingly, multiplexer 308 provides only the lower input (i.e., chunks 26-47) to scratch pad memory 310 from this point on.

When the upper input of multiplexer 308 runs out of received user-data bits, padding bits are inserted into scratch pad memory 310 to complete the sets of 96 bits as shown in row 406. For example, when partitioning circuitry 302 outputs the 84 total bits of chunk 25 (48 bits) and partial chunk 72 (36 bits), twelve padding bits are inserted at the end of the 84 bits to generate set 25 having a total of 96 bits (i.e., 48+36+12=96). Sets 26 to 47 are subsequently generated by inserting 48 padding bits at the end of each of chunks 26 to 47. For example, to generate set 26, scratch pad memory 310 receives chunk 26 of received user-data bits, and 48 padding bits (i.e., chunk 73) are inserted at the end of chunk 26. Note that, although the padding bits are inserted at the end of each set, this operation produces the same results as if (i) the padding bits (i.e., partial chunk 72 and chunks 73 to 94) were inserted at the end of the received user data (i.e., chunks 1 to 72) and (ii) a perfect shuffle were performed on all 94 chunks. In fact, according to alternative embodiments of the present invention, the padding bits may be inserted at the end of the received user data and a perfect shuffle may performed on all 94 chunks.

Insertion of padding bits may be performed using a counter. As one example, a counter could count each set of 96 bits processed by scratch pad memory 310, beginning at zero. When the counter reaches a value of 24 (i.e., corresponding to set 25), the last twelve bits are set to a value of zero. Then, for each subsequent set processed, the last 48 bits in the set are set to zero. Other methods for determining the location in which the padding bits are inserted may be used.

As discussed above, in this embodiment, all of the padding bits are set to a value of zero. According to alternative embodiments, all padding bits could be set to a value of one. In such a case, the hard-decision bits of the corresponding padding values inserted in the read path would be set to a value of one. According to yet other embodiments, some of the padding bits could be set to a value of one and others could be set to a value of zero. For example, the padding bits of chunks 72 to 82 could be set to zero, while the padding bits of chunks 83 to 94 could be set to one. According to these other embodiments, the location(s) in which the padding bits switch from a value of one to a value of zero would need to be known a priori by the receiver. Thus, embodiments that use two different padding-bit values (i.e., zero and one) may be more complex than embodiments that use only one padding-bit value (i.e., zero or one).

Returning to FIG. 3, post-padding interleaver 312 comprises local interleaver 316 and global interleaver 318. Local interleaver 316, which receives the sets of 96 bits from scratch pad memory 310, is a p×p (e.g., 96×96) interleaver that may be implemented using any suitable interleaver, such as a cyclic-shift interleaver, a convolutional interleaver, or an interleaver that performs more-random interleaving than cyclic-shift interleavers and convolutional interleavers such as an omega network. For each set of 96 bits received, local interleaver 316 receives a local interleaving mapping instruction $\pi_{Lc}$ from address ROM 314. The local mapping instruction $\pi_{Lc}$ may be, and preferably is, different from one set of 96 bits to the next (i.e., local mapping instructions $\pi_{Lc}$ range from $\pi_{L1}$ to $\pi_{L47}$).

In interleaving each set of 96 bits, local interleaver 316 re-arranges the bits into four subsets of 24 bits. Each subset of 24 bits corresponds to 24 individual user-data columns of one block column of H-matrix 200. The four subsets generated from each set of 96 bits correspond to as many as l=4, different block columns of H-matrix 200.

After the 96 bits in each set are locally interleaved by local interleaver 316, the 96 bits are provided to global interleaver 318. Global interleaver 318 comprises 47 memory banks 322(1)-(47) and address ROM 320, which together implement a global interleaving mapping scheme $\pi_G$ to interleave the subsets of 24 bits with one another. Each memory bank 322(1)-(47) has 96 total addresses that are arranged into four rows, where each row stores 24 bits. Note that global interleaver 318 could be shared between local/global interleavers 124 and 126, in which case global interleaver 318 would have 54 memory banks.

Global interleaver 318 also has four input ports and four output ports. Each input port provides access for write operations to one row of one memory bank 322 at a time (i.e., all 24 addresses), and the four input ports provide access to four different memory banks 322 at a time. Thus, the four input ports provide access to 96 total addresses (i.e., 4×24=96) of memory banks 322(1)-(47) at a time. Similarly, the four output ports provide access for read operations to four rows of four different memory banks 322 at a time (i.e., 96 addresses total addresses).

For each subset of 24 bits, address ROM 320 provides an address identifier to memory banks 322(1)-(47), which identifies the row of memory banks 322(1)-(47) to which the 24 bits are written. The 24 bits are then written via one of the four input ports to the row corresponding to the address identifier. After all 4,512 bits are stored in memory banks 322(1)-(47), they are output to, for example, LDPC encoder 108. In this case, memory banks 322(1)-(47) may be treated as internal memory of LDPC encoder 108, and the order in which the rows are accessed may be determined by the LDPC encoder scheduler. LDPC encoder 108 accesses memory banks 322(1)-(47) at a rate of four rows (i.e., 96 values) per clock cycle, where each set of four rows corresponds to a single block column of H-matrix 200. The particular rows output are determined by addresses supplied by LDPC encoder 108, which provides the row identifiers to memory banks 322(1)-(47).

Figure 5:
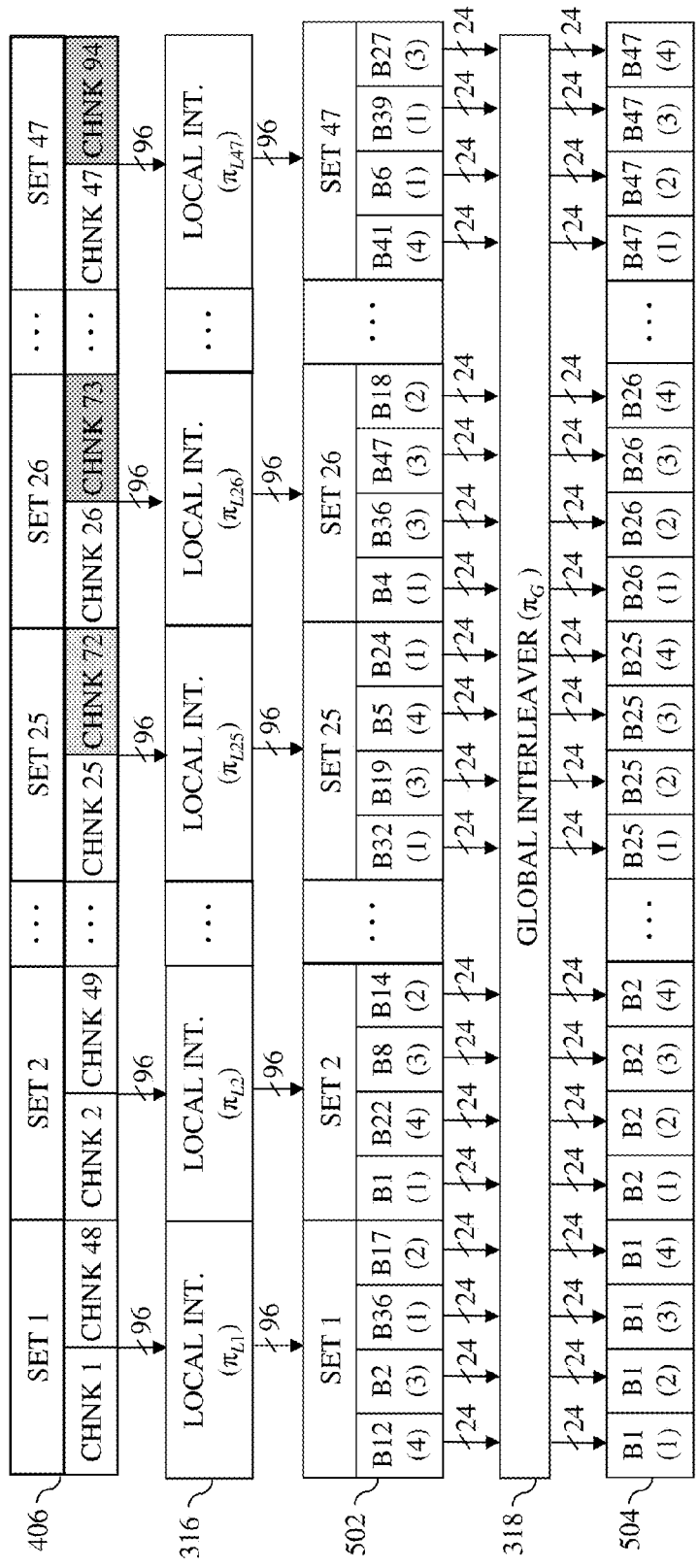
FIG. 5 shows a data flow diagram for an exemplary post-padding interleaving operation performed by the local and global interleavers in FIG. 3.

FIG. 5 shows a data flow diagram for an exemplary post-padding interleaving operation performed by the local and global interleavers of FIG. 3. In data flow diagram 500, upper row 406 corresponds to the 47 sets of bits output by scratch pad 310 as shown in FIG. 4. The sets of bits are received from left to right by local interleaver 316, which performs local interleaving one the 96 bits in each set. As shown in row 502, local interleaving is performed such that the 96 bits in each set are arranged into four subsets. Each subset has 24 bits, all of which correspond to only one user-data block column of H-matrix 200. Further, the four subsets in each set correspond to up to four different block columns. Note that each block column corresponds to four subsets. For example, block column 1 corresponds to subsets B1(1), B1(2), B1(3), and B1(4), each of which corresponds to a different 24 bits of block column 1.

In this example, the first set (set 1) of bits includes (i) the fourth subset of the twelfth block column (B12(4)), (ii) the third subset of the second block column (B2(3)), (iii) the first subset of the 36$^{th}$ block column (B36(1)), and (iv) the second subset of the 17$^{th}$ block column (B17(2)). Before local interleaving, the bits of subsets B12(4), B2(3), B36(1), and B17(2) are spread amongst the set. After local interleaving, the bits of subset B12(4) are grouped together, the bits of subset B2(3) are grouped together, the bits of subset B36(1) are grouped together, and the bits of subset B17(2) are grouped together as shown in row 502. Note that the interleaving of bits in each of sets 25 to 47 spreads the padding bits among the received user-data bits. Thus, in each of sets 25 to 47, the padding bits typically will not all be positioned as the end of the set.

After locally interleaving each set of 96 bits, the four corresponding subsets of 24 bits are output as shown in row 502 to global interleaver 318. Upon receiving four subsets of 24 bits, the four subsets are stored in the appropriate addresses of memory banks 322(1)-(47). Preferably, the four subsets corresponding to each block column are stored in four different memory banks 322. As discussed above, the four output ports of global interleaver 318 provide access to four rows of four different memory banks 322 at a time. Thus, in order to output all four subsets corresponding to one block column at a time, the four corresponding subsets are stored in different memory banks 322 of global interleaver 318 before being output to the decoder.

After all 4,512 bits have been received, the bits may be accessed by LDPC encoder 108, as represented in bottom row 504. LDPC encoder 108 accesses all four subsets corresponding to one block column of H-matrix 200 concurrently via the four output ports of global interleaver 318. Thus, LDPC encoder 108 may access subsets B1(1), B1(2), B1(3), and B1(4) corresponding to the first block column of H-matrix 200, followed by subsets BC2(1), BC2(2), BC2(3), and BC2(4) corresponding to the second block column, and so on. Note the subsets corresponding to each block column may be requested out of order. For example, the subsets corresponding to block column 4 may be requested, followed by the subsets corresponding to block column 1, followed by the subsets corresponding by block column 2, etc. The order in which the subsets are requested is determined by the order in which LDPC encoder 108 and or LDPC decoder 132 processes the block columns.

Figure 6:
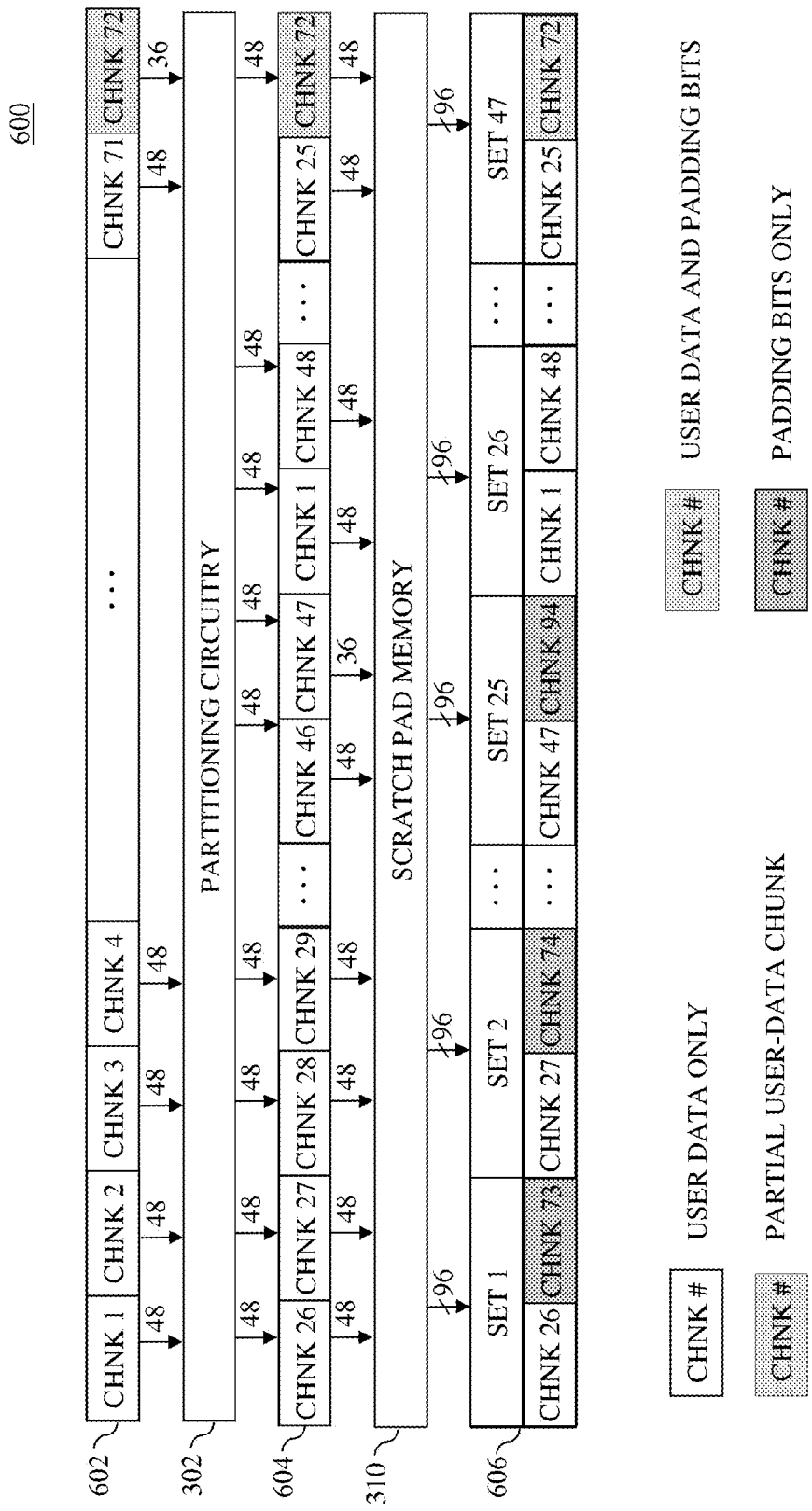
FIG. 6 shows a data flow diagram of another exemplary partitioning and padding bit insertion operation performed by the partitioning circuitry and scratch pad memory of FIG. 3.

FIG. 6 shows a data flow diagram 600 for another exemplary partitioning and padding-bit insertion operation performed by partitioning circuitry 302 and scratch pad memory 310. As shown in row 602, the 3,444 user-data bits are received from left to right by partitioning circuitry 302 in a manner similar to that discussed above in relation to row 402 of data flow diagram 400, where the bits may be divided into chunks. Upon receiving the chunks, partitioning circuitry 302 processes the chunks out of order to decrease processing time. This is in contrast to the processing performed by partitioning circuitry 302 in data flow diagram 400, which processes the chunks in order.

For instance, in data flow diagram 400, the first pair of chunks (i.e., set 1) output by partitioning circuitry 302 includes chunk 1 and chunk 48. In order to output chunks 1 and 48 concurrently, partitioning circuitry 302 must wait until chunk 48 is received. In data flow diagram 600, however, partitioning circuitry 302 may begin outputting chunks to scratch pad memory 310 as soon as the 26th chunk is received as shown in row 604. Partitioning circuitry 302 does not have to wait for the 73rd chunk to be received, because the 73rd chunk, which contains only padding bits, is known a priori by the communications system. Similarly, partitioning circuitry 302 may output the 27th to 47th chunks because chunks 74 to 94, which contain only padding bits, are known a priori by the communications system.

As shown in row 606, after chunks 47 and 94 are output from scratch pad memory 310, partitioning circuitry 302 outputs alternating chunks beginning with chunks 1 and 48. After each set is output from scratch pad memory 310, the set is processed by local interleaver 316 and global interleaver 318.

Figure 7:
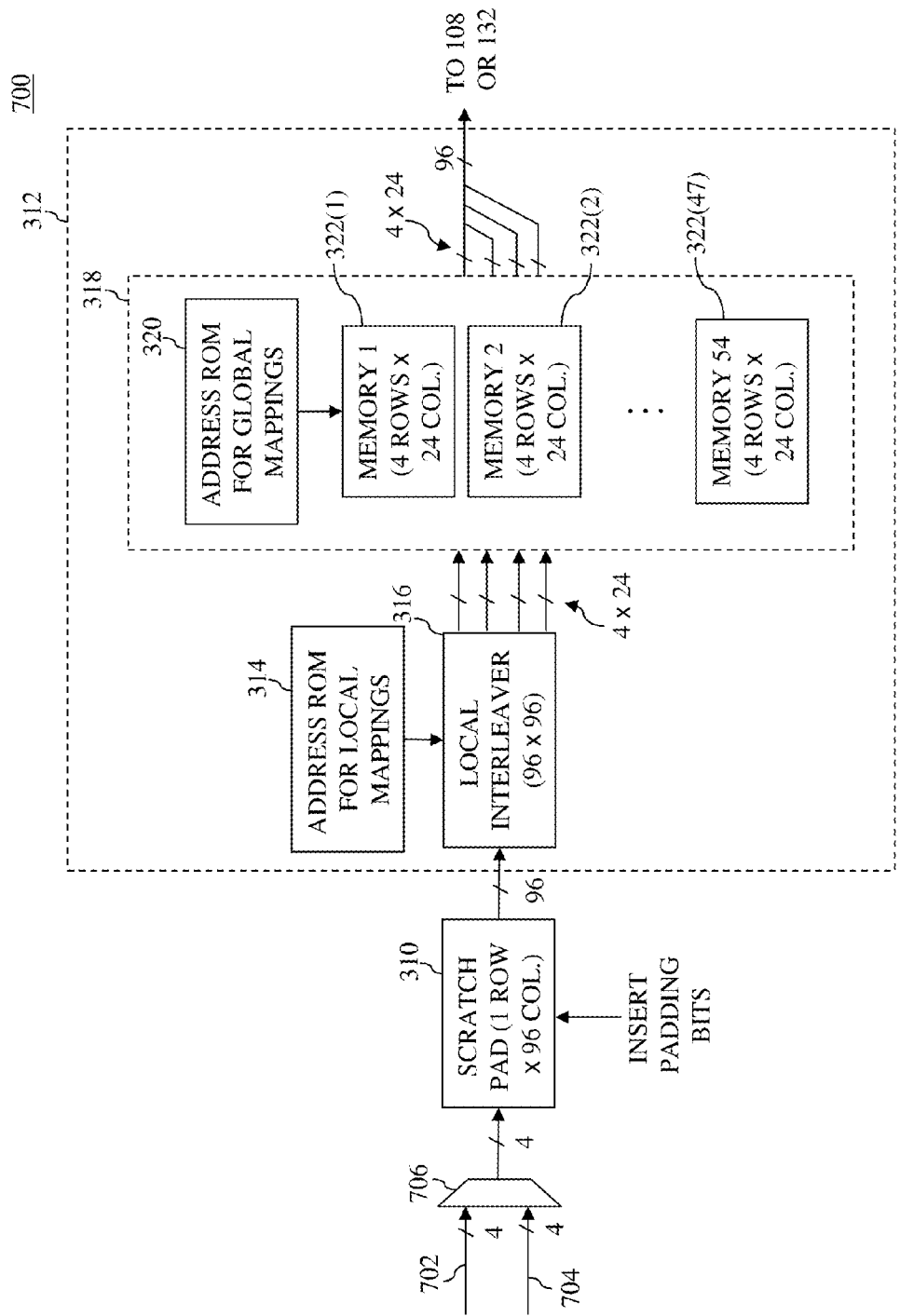
FIG. 7 shows a simplified block diagram of a local/global interleaver according to another embodiment of the present invention.

FIG. 7 shows a simplified block diagram of a local/global interleaver 700 according to another embodiment of the present invention that may be used to implement each of local/global interleavers 106 and 124 in FIG. 1. Interleaver 700 has address ROM 314, local interleaver 316, and global interleaver 318, which operate in a manner similar to the analogous components of interleaver 300 of FIG. 3.

For this discussion, suppose that interleaver 700 is used to implement interleaver 124 of FIG. 1. Further, assume that channel detector 118 is implemented as two channel detectors, where a first of the channel detectors processes a first half of a transmission word, and a second of the channel detectors processes a second half of the transmission word. The first channel detector provides a stream 702 of channel soft-output values $La_n$ corresponding to a first half of a transmission word (e.g., 3,444/2=1,722 channel soft-output values $La_n$) to the upper input of multiplexer 706, and the second channel detector provides a stream 704 of channel soft-output values $La_n$ corresponding to a second half of the transmission word (i.e., 1,722 channel soft-output values $La_n$) to the lower input of multiplexer 706. Prior to padding-bit insertion, multiplexer 706 performs interleaving as a perfect shuffle of the 3,444 channel soft-output values $La_n$. To further understand the operation of multiplexer 706, consider FIG. 8.

Figure 8:
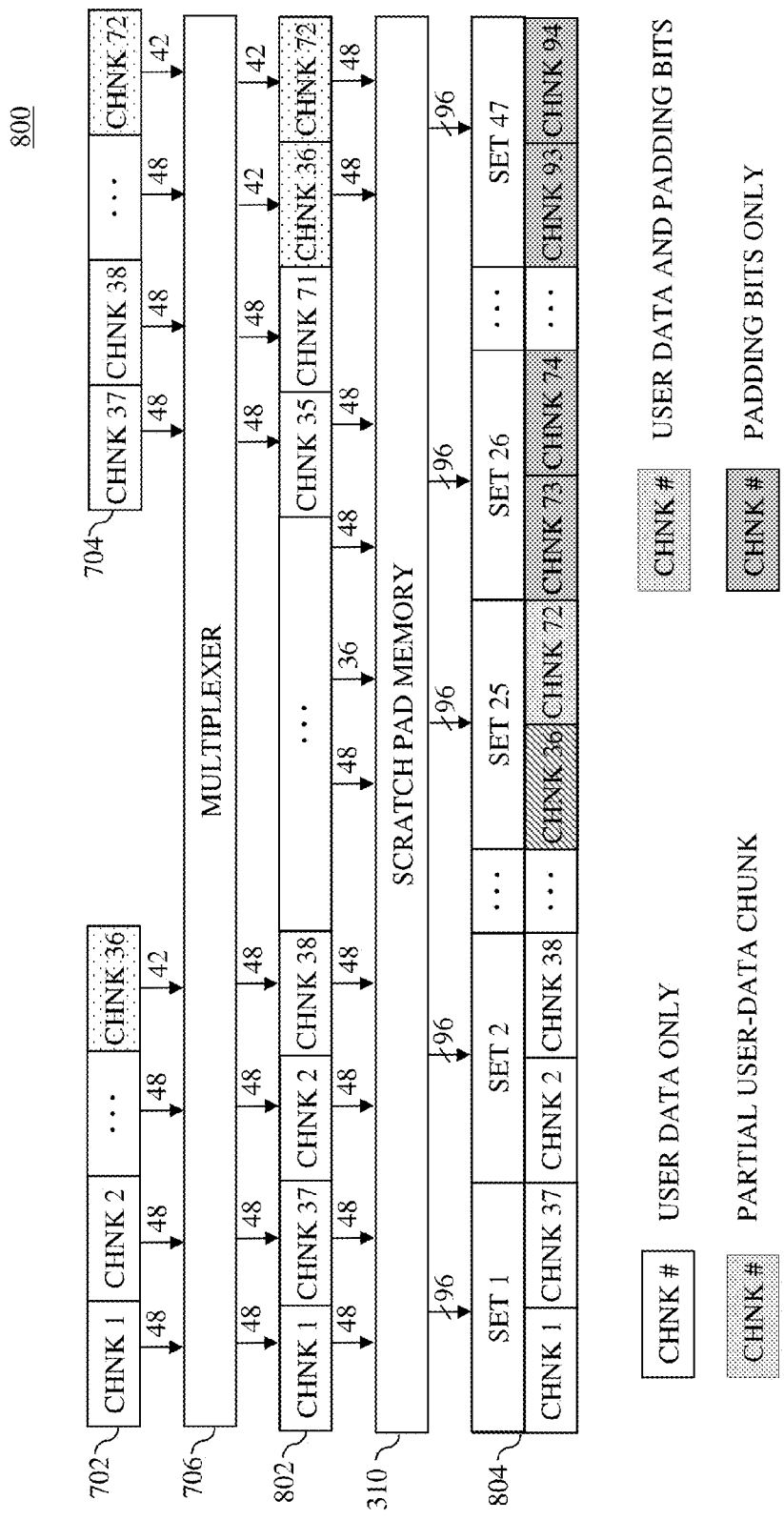
FIG. 8 shows a data flow diagram for an exemplary partitioning and padding bit insertion operation performed by the multiplexer and scratch pad memory of FIG. 7.

FIG. 8 shows a data flow diagram 800 for an exemplary partitioning and padding bit insertion operation performed by multiplexer 706 and scratch pad memory 310. As shown in row 702, the 1,722 channel soft-output values $La_n$ provided to the upper input of multiplexer 706 are divided into 35 full chunks (chunks 1-35) of 48 channel soft-output values $La_n$ and one partial chunk (chunk 36) of 42 channel soft-output values $La_n$. Similarly, as shown in row 704, the 1,722 channel soft-output values $La_n$ provided to the lower input of multiplexer 706 are divided into 35 full chunks (chunks 37-71) of 48 channel soft-output values $La_n$ and one partial chunk (chunk 72) of 42 channel soft-output values $La_n$.

Multiplexer 706 outputs the chunks from the upper and lower inputs in alternating fashion to scratch pad memory 310. As shown in row 802, chunk 1 from the upper input is output to scratch pad memory 310, followed by chunk 37 from the lower input, followed by chunk 2 from the upper input, and so forth, until partial chunks 36 and 72 are output.

Initially, as shown in row 804, scratch pad memory 310 accumulates sets of 96 channel soft-output values $La_n$. Each set comprises two chunks of 48 channel soft-output values $La_n$, one chunk received from the upper input of multiplexer 706 and one chunk received from the lower input of multiplexer 706. Upon receiving partial chunks 36 and 72, six padding values are inserted at the end of partial chunk 36 and six padding values are added at the end of partial chunk 72. Thus, set 25 comprises 96 total values (i.e., 2×(42 channel soft-output values $La_n$+6 padding values)).

After set 25 is output, each of sets 26 to 47 are generated by inserting 96 padding values into scratch pad memory 310. The 12 padding values inserted in set 25 plus the 11×96 padding values inserted in sets 26 to 47 form the M=1,068 padding values needed to generate a total of K=4,512 values provided to LDPC decoder 132.

As used herein, the term "local/global interleaver" refers to an interleaver that performs both local interleaving on a local unit basis and global interleaving on a global unit basis, where (i) the unit basis refers to the number of values treated as a fixed unit for interleaving purposes and (ii) the global unit basis is larger than the local unit basis.

For example, in FIG. 3, local interleaver 316 performs interleaving on each set of 96 bits, where the local unit basis (i.e., the number of values treated as a fixed local unit for local interleaving) is one value. Thus, local interleaver 316 interleaves 96 local units (i.e., 96 bits) at the level of the individual value (i.e., value by value) to generate a set of 96 interleaved values. Global interleaver 318, on the other hand, performs global interleaving on a global unit basis that is smaller than the local set size. In particular, global interleaver 318 interleaves 188 global units (i.e., 47 memory banks×4 global units/memory bank) on a global unit basis value of 24, where each global unit has 24 bits.

Although figures of local/global de-interleavers 130 and 136 are not specifically provided, one of ordinary skill in the art would recognize that de-interleavers 130 and 136 could be implemented by reversing the processing performed by local/global interleavers 106 and 124. Thus, if local/global interleavers 106 and 124 were implemented as shown by local/ global interleaver 300 in FIG. 3, then local/global de-interleavers 130 and 136 could be implemented by reversing the processing of local/global interleaver 300. However, rather than inserting padding bits at scratch pad memory 310, the padding bits that were previously inserted would be discarded. Similarly, if local/global interleavers 106 and 124 were implemented as shown by local/global interleaver 700 in FIG. 7, then local/global de-interleavers 130 and 136 could be implemented by reversing the processing of local/global interleaver 700.

Although the present invention was described relative to its use with local/global interleavers and de-interleavers, the present invention is not so limited. The present invention may be used with interleavers and de-interleavers other than the local/global interleavers and de-interleavers described herein, including interleavers and de-interleaves that do not perform both local and global interleaving and de-interleaving (e.g., purely local interleavers and de-interleavers or purely global interleavers and de-interleavers). For example, alternative embodiments may be envisioned in which the local/global interleavers and de-interleavers of FIG. 1 are replaced with row-column interleavers or omega networks.

Although the present invention was described relative to the specific H-matrix 200 of FIG. 2, the present invention is not so limited. The present invention may be implemented for various H-matrices that are suitable for message-passing decoding and that are the same size as or a different size from matrix 200 of FIG. 2. For example, the present invention may be implemented for H-matrices in which the number of columns, block columns, rows, block rows, layers (including implementations having only one layer), messages processed per clock cycle, the size of the sub-matrices, the size of the layers, and/or the column and/or row hamming weights differ from that of H-matrix 200. Such H-matrices may be, for example, cyclic, quasi-cyclic, non-cyclic, regular, or irregular H-matrices. H-matrices that are irregular do not have the same hamming weight $w_r$ for all rows and/or the same hamming weight $w_c$ for all columns. Further, such H-matrices may comprise sub-matrices other than circulants including zero matrices.

It will be further understood that various changes in the details, materials, and arrangements of the parts which have been described and illustrated in order to explain the nature of this invention may be made by those skilled in the art without departing from the scope of the invention as expressed in the following claims. For example, the number of channel soft-output values $La_n$ provided from channel detector 118 may be greater than or less than four channel soft-output values $La_n$ per clock cycle depending on how the channel detector(s) are implemented. As another example, the number of input and output ports of global interleaver 318 may be greater than or less than four, and the number of channel soft-output values $La_n$ accessed per input and output port may be greater than or less than 24. As yet another example, the number of global memories 322 and the size of global interleaver memories 322 may vary from one embodiment to the next. As even yet another example, scratch pad 310 and local interleaver 316 could be sized to process a number of channel soft-output values $La_n$ other than p. For instance, scratch pad memory 310 and local interleaver 316 could process 2p channel soft-output values $La_n$, where each set of p channel soft-output values $La_n$ corresponds to a different block column of H-matrix 200, or p/2 channel soft-output values $La_n$ corresponding to half of one block column of H-matrix 200. The number of input ports, output ports, the size of global interleaver memories 322, and the number of global interleaver memories 322 may be changed to accommodate the change in the number of channel soft-output values $La_n$ processed by scratch pad memory 310 and local interleaver 316.

Although the embodiment of FIG. 1 was described as having a controller that (i) receives a programmable transmission word size and (ii) determines the number D of user-data bits and the number M of padding bits based on the transmission word size, the present invention is not so limited. According to alternative embodiments, one or more of the number M of padding bits, the number D of user-data bits, and the number D of user-data bits may be input, and the remaining non-input values may be determined.

Various embodiments of the present invention may be implemented using a local unit basis and/or a global unit basis other than those discussed above in relation to FIGS. 3 and 7. For example, embodiments of the present invention may be envisioned in which the local interleaver performs interleaving on sets of channel soft-output values $La_n$ on a local unit basis value of two (e.g., two-value local units are interleaved with other two-value local units). As another example, various embodiments may be envisioned in which the global de-interleaver performs global de-interleaving on a global unit basis value of twelve (e.g., 96 twelve-value global units are de-interleaved global unit by global unit). In that case, for each set of 96 values, the local de-interleaver would generate eight twelve-value global units for the global interleaver.

Although the present invention was described relative to its use with HDD systems and "0.5 KB" sector sizes, the present invention is not so limited. The present invention may be used in signal processing systems other than HDD systems. Further, the present invention may be used in HDD systems having sector sizes other than "0.5 KB" including but not limited to "4 KB" sector sizes.

Further, although the present invention was described relative to its use with binary LDPC encoding and decoding, where each element of the H-matrix is either a binary one or zero, the present invention is not so limited. The present invention may be implemented using non-binary LDPC encoding and decoding, where each element of the H-matrix comprises p^m bits. Each element of the H-matrix is an element of Galois field(q) or GF(q) in which q=p^m, p is a prime number and m is a positive integer. In addition, the present invention may be implemented with other error-correction encoding and decoding techniques other than LDPC encoding and decoding.

The present invention may be implemented using non-binary LDPC encoding and decoding, where each element of the H-matrix comprises p^m bits. Each element of the H-matrix is an element of Galois field(q) or GF(q) in which q=p^m, p is a prime number and m is a positive integer. In addition, the present invention may be implemented with other error-correction encoding and decoding techniques other than LDPC encoding and decoding.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The present invention can also be embodied in the form of a bitstream or other sequence of signal values stored in a non-transitory recording medium generated using a method and/or an apparatus of the present invention.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A computer-implemented method for generating a transmission word for a set of user-data values, the method comprising:
    (a) adding, by a padding-value inserter, a set of padding values to the set of user-data values to form a dataword;
    (b) interleaving, by an interleaver, the dataword;
    (c) encoding, by an encoder, the interleaved dataword to generate a codeword comprising the set of user-data values and a set of parity values; and
    (d) generating, by a transmission-word generator, the transmission word comprising the set of user-data values and the set of parity values, wherein:
    the transmission word is smaller than the codeword;
    the interleaving of step (b) is local/global interleaving; and step (b) comprises:
    (b1) the interleaver interleaving on a local unit basis, a first subset of dataword values to generate a first group of two or more global units;
    (b2) the interleaver interleaving on the local unit basis, a second subset of dataword values to generate a second group of two or more global units; and
    (b3) the interleaver interleaving on a global unit basis, greater than the local unit basis, at least the global units of the first and second groups to generate the interleaved dataword.

2. The method of claim 1, wherein the transmission word does not include any of the padding values.

3. The method of claim 1, wherein the method further comprises, prior to step (a):
    (i) receiving a programmable value corresponding to size of the transmission word; and
    (ii) selecting, based on the programmable value, (1) size of the set of user-data values and (2) size of the set of padding values.

4. The method of claim 1, wherein the method further comprises interleaving the set of user-data values prior to step (a).

5. The method of claim 1, wherein step (d) comprises:
    (d1) de-interleaving the parity values to generate de-interleaved parity values; and
    (d2) multiplexing the de-interleaved parity values and the user-data values to generate the transmission word.

6. The method of claim 1, wherein, in step (a), the padding values are appended at the end of the set of user-data values to form the dataword.

7. An apparatus for generating a transmission word for a set of user-data values, the apparatus comprising:
    a padding-value inserter configured to add a set of padding values to the set of user-data values to form a dataword;
    an interleaver configured to interleave the dataword;
    an encoder configured to encode the interleaved dataword to generate a codeword comprising the set of user-data values and a set of parity values; and
    a transmission-word generator configured to generate the transmission word comprising the set of user-data values and the set of parity values, wherein:
    the transmission word is smaller than the codeword;
    the interleaver is a local/global interleaver comprising:
        a local interleaver configured to:
            interleave on a local unit basis, a first subset of dataword values to generate a first group of two or more global units; and
            interleave on the local unit basis, a second subset of dataword values to generate a second group of two or more global units; and
        a global interleaver configured to interleave on a global unit basis, greater than the local unit basis, at least the global units of the first and second groups to generate the interleaved dataword.

8. The apparatus of claim 7, wherein the transmission word does not include any of the padding values.

9. The apparatus of claim 7, further comprising a controller configured to:
    receive a programmable value corresponding to size of the transmission word; and
    select, based on the programmable value, (1) size of the set of user-data values and (2) size of the set of padding values.

10. The apparatus of claim 7, further comprising partitioning circuitry configured to interleave the set of user-data values prior to the padding-value inserter adding the padding values to the set of user-data values.

11. The apparatus of claim 7, wherein the transmission word generator comprises:

a de-interleaver configured to de-interleave the parity values to generate de-interleaved parity values; and a multiplexer configured to multiplex the de-interleaved parity values and the user-data values to generate the transmission word.

12. The apparatus of claim 7, wherein the padding-value inserter is configured to append the padding values at the end of the set of user-data values to form the dataword.

13. The apparatus of claim 7, wherein the apparatus is an integrated circuit.

* * * * *